Dec. 2, 1958          T. TINKER          2,862,693
SUPPORT FOR FINNED TUBE TYPE HEAT EXCHANGERS
Filed July 24, 1953
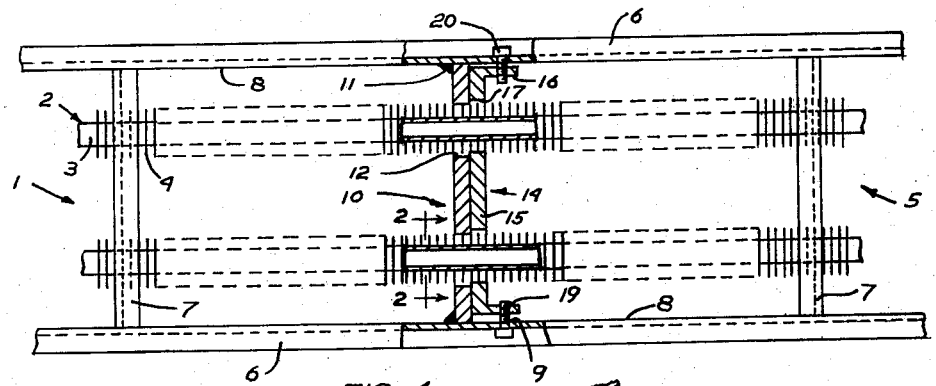
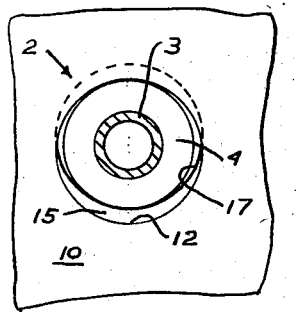
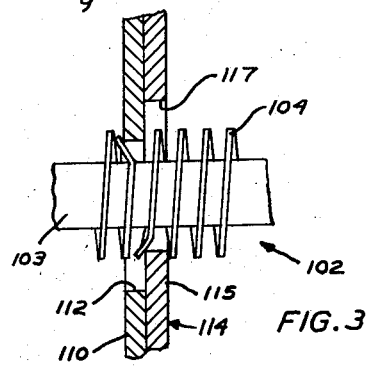
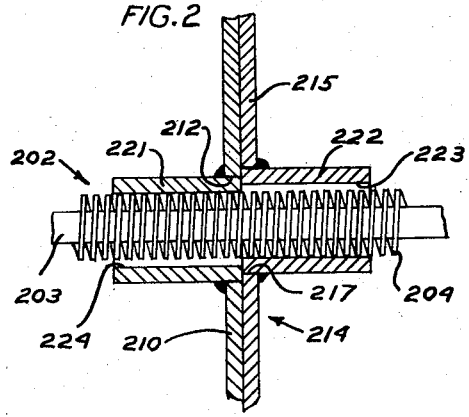
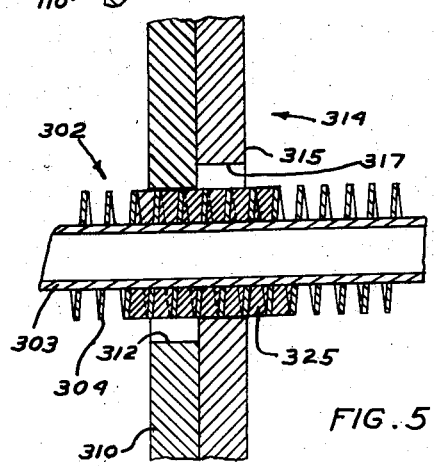
TOWNSEND TINKER
INVENTOR.
BY
Andrew K. Foulds
HIS ATTORNEY

1

2,862,693

SUPPORT FOR FINNED TUBE TYPE HEAT EXCHANGERS

Townsend Tinker, Orchard Park, N. Y., assignor, by mesne assignments, to American Radiator & Standard Sanitary Corporation, New York, N. Y., a corporation of Delaware Application July 24, 1953, Serial No. 370,195

12 Claims. (Cl. 257—163)

This invention relates generally to a new and useful support for finned tubes in a finned tube heat exchanger and particularly to a finned tube clamping mechanism that is adjustable for ease of assembly and dis-assembly of the finned tubes.

In the art of heat exchangers, the finned tube type heat exchanger has found many commercial uses due to the large heat exchange area of the fins. However, in certain installations it has been found that continuous vibration imparted to the finned tubes creates metal fatigue at the finned joints and at the header connections. Due to this metal fatigue, the tubes will either leak at the header connection or the fins will become disconnected from the tube with a resulting loss of efficiency. These disadvantages materially decrease the length of service of this type of heat exchanger. To eliminate the vibration problem and to extend the length of service of the finned tubes, various methods of vibration dampening have been attempted in the past. One of the methods was to machine both the support members and the finned tubes to close tolerances. Another method has been to insert a resilient vibration dampening means between the finned tube and the support member. The first stated method has met with limited success because even with the close tolerances there is still sufficient clearance to permit vibration and wear. The method of inserting resilient vibration dampening means has also met with limited success due to the wear of the resilient member and subsequent clearance between the tubes and the support member to permit vibration and wear of the tubes. Also, with the known methods of vibration dampening, the assembly and dis-assembly of the heat exchanger is expensive and time consuming.

Therefore, one object of this invention is to provide a clamping support member that will effectively reduce vibration of finned tubes in a finned tube heat exchanger assembly.

Another object of this invention is to provide a tube support having an adjustable clamp member which is operable to clamp a finned tube against a fixed support to prevent vibration.

Another object of this invention is to provide a finned tube type heat exchanger that is easily assembled and dis-assembled.

Another object is to provide a finned tube support assembly that is rugged in construction, easy to assemble and install, and economical to manufacture.

Other objects will become apparent from time to time throughout the specification and claims as hereinafter related.

This invention comprises the new and improved construction and combination of parts and their operating relation to each other which will be more fully described hereinafter and the novelty of which will be particularly pointed out and distinctly claimed.

In the accompanying drawings, to be taken as part of the specification, there are fully and clearly illustrated several preferred embodiments of this invention, in which drawings:

Figure 1 is a somewhat diagrammatic view in side elevation of a section of a finned tube heat exchanger, with the support members and a portion of the finned tubes shown in a broken section.

Figure 2 is a fragmentary sectional view taken along the line 2—2 in Figure 1.

Figure 3 is a fragmentary sectional view of another form of this invention.

Figure 4 is a fragmentary sectional view of another form of this invention.

Figure 5 is a fragmentary sectional view of still another form of this invention.

Referring to the drawings by numerals of reference and more particularly to Figure 1, there is shown more or less diagrammatically a portion of a heat exchanger 1 having a plurality of finned tubes 2. The finned tubes 2 have a tube member 3 and a plurality of outwardly extending fins 4. It should be noted that the fins 4 are shown more or less diagrammatically and that the helical type fin is preferred as is shown in the other views. Surrounding the finned tubes 2 is a supporting frame 5. The frame 5 has horizontal wall members 6 and vertical wall members 7. The horizontal wall member 6 is generally channel-shaped and has an inner wall 8 with bolt retaining apertures 9 therein. The vertical wall members 7 define a section of the heat exchanger 1 which may have several sections. The horizontal wall members 6, and the finned tubes 2 are continuous and may form several similar sections. Secured to the inner wall 8 of the horizontal frame member 6 is a tube support plate 10. The tube support plate 10 is rigidly secured to the horizontal frame member inner wall 8 by means of welds 11. The tube support member 10 has a plurality of tube supporting apertures 12 therein through which extend the finned tubes 2. Adjacent the tube support member 10 there is positioned a clamp plate 14 having a flat wall portion 15 and flanged portions 16. The clamp plate wall portion 15 has a plurality of apertures 17 therein initially aligned with support plate apertures 12. The clamp plate flange portions 16 have aligned threaded apertures 19 therein which receive threaded bolts 20 extending through the horizontal wall apertures 9. The finned tubes 2 extend through support plate apertures 12 and clamp plate apertures 17. The walls of the support plate apertures 12 and the clamp plate apertures 17 overlie a plurality of the fins 4. The bolt members 20 support the clamp plate 14 and are adjustable to move the same in a direction transverse to the finned tubes 2 so that a portion of the wall of clamp plate aperture 17 will exert a pressure against a plurality of fins 4. The pressure exerted by the clamp member 14 will move the central portion of finned tubes 2 into rigid engagement with a portion of the wall of support plate aperture 12. Since the width of the support plate 10 is sufficient to extend over a plurality of fins 4, the wall of the support plate aperture will rigidly engage a plurality of fins 4. The finned tubes 2 are rigidly supported against the support plate 10 and held in this rigid position by the clamp plate 14. A rigid connection is thus secured between the heat exchanger frame 5 and the finned tubes 2. With this type of rigid connection, the finned tubes are supported at their ends by the end walls 7 and at their central portions by this clamp mechanism and thus are not free to vibrate independently of the frame 5.

To remove the finned tubes 2 from the heat exchanger 1, the bolts 20 are adjusted to align the apertures 12 in support plate 10 with the apertures 17 in the clamp plate 14. Since the above stated apertures are slightly larger than the diameter of the finned tubing, removal of the tubing is easily accomplished without damage to the fins.

In Figure 3 there is shown another embodiment of the heretofore described invention. In a fragmentary section, there is shown a finned tube 102 having a tube member 103 and a plurality of outwardly extending helical fins 104. A fragmentary section of a support plate wall 110 is shown having an aperture 112 therein. Adjacent the support plate 110 there is shown a fragmentary section of the flat wall portion 115 of a clamp plate 114. The clamp plate wall portion 115 has an aperture 117 therein. The support plate wall 110 and the clamp plate wall 115 each have a thickness less than the distance between successive turns of the helical fin 104. When the clamp plate 114 is moved in a direction transverse to the finned tube 102 it passes between adjacent fins 104. The clamp plate wall will pass a given distance between the outer edges of the fin members 104 until the wall of aperture 117 strikes a portion of the helical fin positioned across its path of movement. Further movement of the clamp plate 114 will move the finned tube 102 into contact with a portion of the wall of the aperture 112 of the support plate 110. This movement of the clamp plate 114 will usually bend the outer edge of several fins 104 in reaching a rigid clamping position. With this type of arrangement, the clamp plate 114 is usually adjusted a greater distance than the sub-clamp plate 14 in Figure 1. This additional adjustment will bend several of the helical fins 104 and assure a rigid connection between the support plate 110 and the finned tube 102. It should be noted that it is not possible for the wall of apertures 112 of the support member 110 or the wall of apertures 117 of the clamp member 114 to come in contact with the tube member 103 because of the helical shape of the fins 104. When this embodiment of the invention is used with concentric type fins the support member and the clamp member may be relatively moved to exert a pressure directly on the tube member instead of on the fins. An advantage of this embodiment is that both the support member and the clamp member may be made of relatively thin sheet steel resulting in substantial material savings. It has been found that the bending or distortion of the fins by the support and clamp plates does not materially affect the heat transfer of the heat exchanger in this embodiment of the invention.

In Figure 4 there is shown another embodiment of this invention having a finned tube 202. The finned tube 202 has a tube member 203 and a helical fin 204. There is shown a fragmentary portion of the support plate 210 having an aperture 212 therein. Secured in the aperture 212 there is a sleeve member 221 which projects outwardly therefrom and surrounds finned tube 202. Adjacent the tube support plate 210 there is a clamp plate 214 having a flat wall portion 215 with an aperture 217 therein. The aperture 217 has a sleeve member 222 secured therein and projecting outwardly therefrom and surrounding the finned tube 202. The sleeve members 221 and 222 are substantially aligned, and the tube member 202 extends therethrough. When the clamp plate 214 is adjusted laterally of the finned tube 202, the inner wall 223 of the sleeve 222 will move against a section of the helical fin 204 which, in turn, will move the finned tube 202 to engage the fins 204 rigidly with the inner wall 224 of the sleeve 221. With these sleeves provided on the support plate and the clamp plate, a larger area of contact is maintained between the support plate and clamp plate and the finned tube.

The embodiment of this invention shown in Figure 5 is similar to the invention shown in Figure 1 except that a filler 325 is arranged between the adjacent sides of the fins 304 and extends substantially to the outer edge thereof. The filler 325 is arranged between a sufficient number of fins so that the wall of the support plate aperture 312 and the clamp plate aperture wall 317 will come in contact with the filler instead of exerting a pressure against the fins 304. In this embodiment the clamp member 314 may be adjusted to a more firm position without damaging the fins 304 or the tube 303. It will be seen in this embodiment that a more secure connection can be obtained. The filler that is positioned between the fins 304 may be either solder or any suitable fusible material and would be cast in position by use of a suitable mold around the portion of the fins to be filled.

Having thus described the invention, what is claimed and is desired to be secured by Letters Patent of the United States is:

1. In a heat exchanger, a tube having a plurality of outwardly projecting fins thereon, a supporting frame for said tube having side walls and end walls, said end walls having apertures in which the ends of said tube are secured, a tube support plate rigidly secured to the side walls of said frame and extending laterally to the middle portion of said tube and having an aperture therein, said side walls having aligned apertures adjacent said support plate, a clamp plate having a wall portion and an aperture therein and flanged ends, said flanged ends having threaded apertures therein, threaded bolt members extending through said side wall apertures into said threaded apertures and supporting said clamp plate adjacent to said tube support plate with said support plate and clamp plate apertures initially aligned and said tube and fins extending therethrough, and said bolt members being adustable to move said clamp plate to engage its aperture wall with said fins to move and hold said fins in rigid engagement with the wall of said tube support plate aperture.

2. In a heat exchanger, a tube having a helical fin thereon, a supporting frame for said tube having side walls and end walls, said end walls having apertures in which the ends of said tube are secured, a tube support plate rigidly secured to the side walls of said frame and extending laterally to the middle portion of said tube and having an aperture therein, said side walls having aligned apertures adjacent said support plate, a clamp plate having a wall portion and an aperture therein and flanged ends, said flanged ends having threaded apertures therein, threaded bolt members extending through said side wall apertures into said threaded apertures and supporting said clamp plate adjacent to said tube support plate with said support plate and clamp plate apertures initially aligned and said tube and fins extending therethrough, said support plate and said clamp plate having a thickness less than the distance between successive turns of said fin helix, and said bolt members being adjustable to move said clamp plate to move its aperture wall between successive turns of said fins to engage the same to move and hold said fins in rigid engagement with the wall of said tube support plate aperture.

3. In a heat exchanger, a tube having a helical fin thereon, a supporting frame for said tube having side walls and end walls, said end walls having apertures in which the ends of said tube are secured, a tube support plate rigidly secured to the side walls of said frame and extending laterally to the middle portion of said tube and having an aperture therein, said side walls having aligned apertures adjacent said support plate, a clamp plate having a wall portion and an aperture therein and flanged ends, said flanged ends having threaded apertures therein, threaded bolt members extending through said side wall apertures into said threaded apertures and supporting said clamp plate adjacent to said tube support plate with said support plate and clamp plate apertures initially aligned and said tube and fins extending therethrough, said support plate and said clamp plate having a thickness sufficient to provide aperture walls overlying several turns of said helix, and said bolt members being adjustable to move said clamp plate to engage its aperture wall with said fins to move and hold said fins in rigid engagement with the wall of said tube support plate aperture.

4. A heat exchanger as defined in claim 3 in which the successive turns of the fin helix contacted by the aperture walls are filled substantially to the edge of the fin with a fusible filler material.

5. In a heat exchanger, a tube having a helical fin thereon, a supporting frame for said tube having side walls and end walls, said end walls having apertures in which the ends of said tube are secured, a tube support plate rigidly secured to the side walls of said frame and extending laterally to the middle portion of said tube and having an aperture therein, said side walls having aligned apertures adjacent said support plate, a clamp plate having a wall portion and an aperture therein and flanged ends, said flanged ends having threaded apertures therein, threaded bolt members extending through said side wall apertures into said threaded apertures and supporting said clamp plate adjacent to said tube support plate with said support plate and clamp plate apertures initially aligned and said tube and fins extending therethrough, tubular sleeve members surrounding said helical fin and secured to said support plate and said clamp plate at their respective apertures, and said bolt members being adjustable to move said clamp plate to engage its sleeve member with said fins to move and hold said fins in rigid engagement with said support plate sleeve member.

6. In a heat exchanger, a finned tube, a supporting frame for said tube having side walls and end walls, said end walls having aligned apertures therethrough, a tube support member secured to said side walls between said end walls and having an aperture therethrough, said tube support member aperture being aligned with said end wall apertures, a clamp member having an aperture therethrough, said clamp member being positioned adjacent to said tube support member and movably secured to said supporting frame side walls, said clamp member aperture being initially aligned with said tube support member aperture, said finned tube extending through said aligned apertures, and means to move said clamp member to engage its aperture wall with said finned tube to move and hold said finned tube in rigid engagement with the wall of said tube support member aperture.

7. In a heat exchanger, a finned tube having outwardly projecting heat transfer fins thereon, a supporting frame for said tube having side walls and end walls, said end walls having aligned apertures therethrough, a tube support member secured to said side walls between said end walls and having an aperture therethrough, said tube support member aperture being aligned with said end wall apertures, a clamp member having an aperture therethrough, said clamp member being positioned adjacent to said tube support member and movably secured to said supporting frame side walls, said clamp member aperture being initially aligned with said tube support member aperture, said tube and said fins extending through said aligned apertures, said tube support member and said clamp support member apertures having walls of sufficient width to overlie a plurality of said fins, and means to move said clamp member to cause a portion of the wall of its aperture to engage a portion of said fins to move said fins into rigid engagement with the wall of said tube support member aperture.

8. In a heat exchanger, a tube having a helical fin thereon, a supporting frame for said tube having side walls and end walls, said end walls having aligned apertures therethrough, a tube support member secured to said side walls between said end walls and having an aperture therethrough, said tube support member aperture being aligned with said end wall apertures, a clamp member having an aperture therethrough, said clamp member being positioned adjacent to said tube support member and movably secured to said supporting frame side walls, said clamp member aperture being initially aligned with said tube support member aperture, said finned tube extending through said aligned apertures, said support member and said clamp member being of a thickness less than the distance between successive turns of the finned helix, and means to move said clamp member to engage its aperture wall between successive turns of said helical fin to move said fin into rigid engagement with the wall of said tube support member aperture.

9. In a heat exchanger, a tube having a plurality of outwardly extending fins thereon, a supporting frame for said tube having side walls and end walls, said end walls having aligned apertures therethrough, a tube support member secured to said side walls between said end walls and having an aperture therethrough, said tube support member aperture being aligned with said end wall apertures, a sleeve member having one end secured in said tube support member aperture and projecting outwardly therefrom, a clamp member having an aperture therethrough, a second sleeve member having one end secured in said aperture and projecting outwardly therefrom, said clamp member being positioned adjacent to said tube support member and movably secured to said supporting frame side walls, said first sleeve member and said second sleeve member being initially aligned with said supporting frame end wall apertures, said tube and fins extending through said aligned apertures and said sleeve members, and means to move said clamp member to engage the inner wall of its sleeve member with said fins to move and hold said fins in rigid engagement with the inner wall of said other sleeve member.

10. In a heat exchanger, a tube having a plurality of outwardly extending fins thereon, a supporting frame for said tube having side walls and end walls, said end walls having aligned apertures therethrough, a tube support member secured to said side walls between said end walls and having an aperture therethrough, said tube support member aperture being aligned with said end wall apertures, a clamp member having an aperture therethrough, said clamp member being positioned adjacent to said tube support member and movably secured to said supporting frame side walls, said clamp member aperture being initially aligned with said tube support member aperture, said finned tube extending through said aligned apertures, filler means filling the space between the adjacent fins within said tube support member and clamp member, and said filler means extending substantially to the outer edge of said fins, and means to move said clamp member to engage its aperture wall with said filler means to move and hold the same in rigid engagement with the wall of said tube support member aperture.

11. In a heat exchanger the combination comprising a fixed support, a finned tube rigidly supported thereon at spaced points, an adjustable support positioned at an intermediate point between said spaced points and comprising a first member rigidly secured to said fixed support and a second member adjustably secured to said fixed support, said members having initially aligned apertures for receiving therethrough a portion of said finned tube intermediate said spaced points, said second member being adjustable with respect to said fixed support to squeeze and deform said fins between the side walls of said apertures to resiliently secure said finned tubes at said intermediate point and thereby avoid vibration normally resulting from wear between the fins and the side walls of said apertures.

12. In a heat exchanger the combination comprising a finned tube rigidly supported at spaced points therealong to a frame member, an additional tube support member fixed to said frame member intermediate said spaced points and having an aperture therein, a clamp member positioned between said spaced points and having an aperture therein initially aligned with said first aperture, said finned tube passing through said aligned apertures, said clamp member being adjustably secured to said frame member adjacent said tube support member to move said clamp member to clamp said finned tube against the wall of the aperture in said tube support member to suppress vibration of said finned tube and avoid metal fatigue and the disconnection of said fins from said tube.

References Cited in the file of this patent

UNITED STATES PATENTS

| | | |
|---|---|---|
| 884,013 | Gage | Apr. 7, 1908 |
| 1,500,895 | Rover | July 8, 1924 |
| 1,608,772 | Cole | Nov. 30, 1926 |
| 1,772,806 | Grace | Aug. 12, 1930 |
| 2,241,209 | Lea | May 6, 1941 |
| 2,256,993 | Van Vleet | Sept. 23, 1941 |
| 2,440,803 | Lea | May 4, 1948 |
| 2,675,722 | Fleming | Apr. 20, 1954 |

FOREIGN PATENTS

| | | |
|---|---|---|
| 532,968 | Great Britain | Feb. 4, 1941 |